WIDE RANGE MAGNETIC RECORDING SYSTEM AND METHOD

Filed Dec. 29, 1951

INVENTOR.
MICHAEL RETTINGER
BY Val R. Goshaw
ATTORNEY

Patented Aug. 3, 1954

2,685,618

UNITED STATES PATENT OFFICE 2,685,618

WIDE RANGE MAGNETIC RECORDING SYSTEM AND METHOD

Michael Rettinger, Encino, Calif., assignor to Radio Corporation of America, a corporation of Delaware Application December 29, 1951, Serial No. 264,193

8 Claims. (Cl. 179—100.2)

Figure 1:
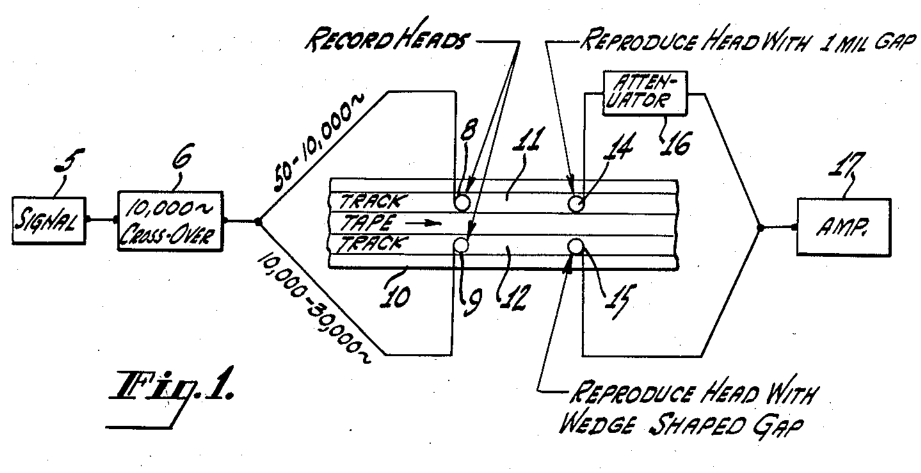

This invention relates to magnetic sound recording and reproducing systems, and particularly to a method of and means for improving the quality of magnetically recorded sound by increasing the recorded frequency range for any given magnetic tape speed.

In co-pending U. S. application, Ser. No. 193,203, filed October 31, 1950, of A. W. Friend, a method of and system for increasing the quantity of information that may be recorded on a magnetizable medium, such as tape or film, is disclosed and claimed. Also, Hehr U. S. Patent 2, 547,464 of April 3, 1951, shows a multiple track recording system in which bands of different frequencies are recorded in separate tracks. It is well-known, in the art of magnetic sound recording and reproducing, that a magnetizable medium may have a signal impressed thereon by varying the magnetic field between two pole pieces of a core, the ends of the pole pieces being separated from one another to form a gap. Thus, the gaps of magnetic recording and reproducing transducers or heads have a finite width in the direction of movement of the medium. When the length of one full wave of the signal being impressed on the medium is equal to the width of the gap, the output signal obtained is substantially zero. This is referred to as a null point in the reproduction characteristic and occurs at a null frequency, which is the frequency at which the wave length of the magnetic impression on the magnetizable medium is equal to the gap width. For instance, the null frequency for a magnetic medium speed of 7½ inches per second occurs at about 12,500 cycles per second when the gap width is .0005 inch. When the speed of the medium is higher, the null frequency is higher.

When the null frequency is exceeded, the reproducing transducer again responds to the impressed signal until a second null frequency region is reached. This cycle is repetitive with nulls occurring substantially at integral multiples of the first null frequency. The region between the occurrences of the nulls is usable for recording signals. However, if a signal extends over one or more null points, the null frequencies will be lost. This phenomenom is disclosed in Holmes, et al. U. S. Patent No. 2,536,810 of January 2, 1951.

The present invention is directed to a method of and system for avoiding the effect of these nulls so that wide frequency ranges such as 50 to 30,000 cycles may be recorded and reproduced on a magnetizable medium without the loss of any frequency within the ranges.

The principal object of the invention, therefore, is to facilitate the magnetic recording and reproducing of signals.

Another object of the invention is to provide an improved method of and system for magnetically recording and reproducing sound signals.

A further object of the invention is to provide a method of and system for recording all frequencies in signals having wide ranges of frequencies at normal speeds of the magnetic recording medium.

Figure 2:
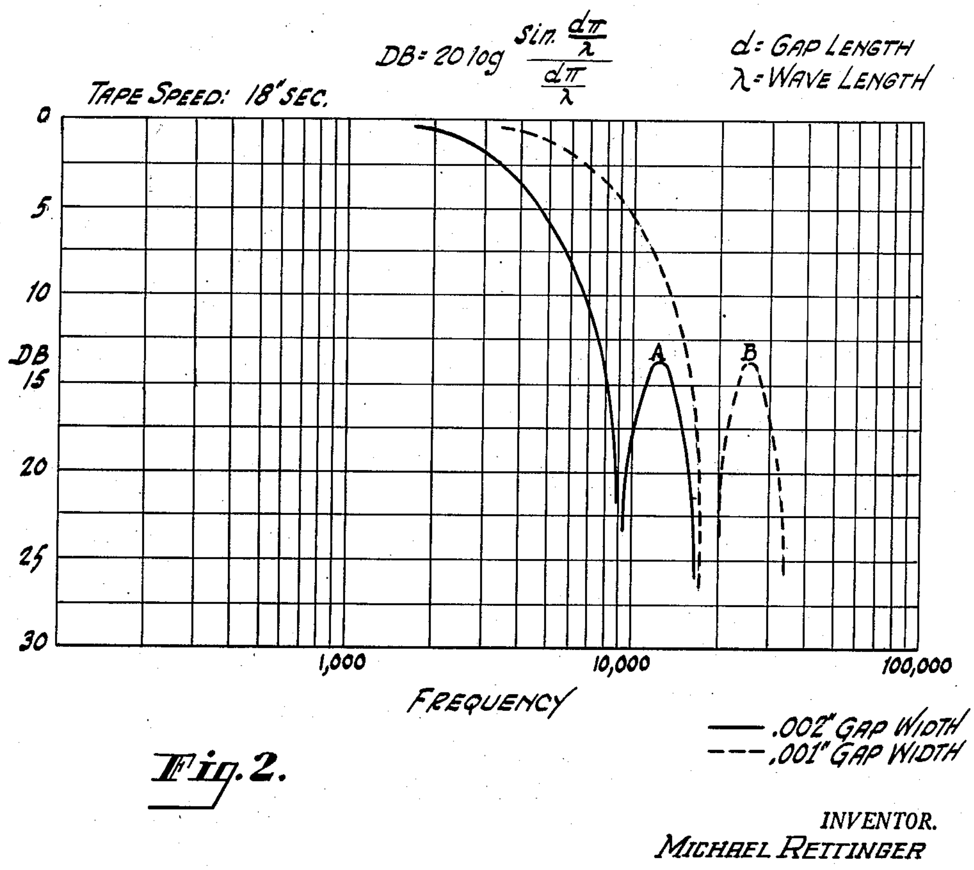

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a combination block diagram and diagrammatic view of a system embodying the invention, and Fig. 2 is a graph showing the upper region of typical response characteristic curves for transducers having gaps of two different widths.

Referring now to the drawings, in which the same numerals identify like elements, a signal source 5 may be of any standard type, such as a microphone. The source 5 is shown connected to a cross-over network unit 6 which may include filters to divide the signal into two frequency bands. Assuming that the signal source has a range of frequencies between 50 and 30,000 cycles per second, it may be divided so that one band will have a range of substantially 50 to 10,000 cycles per second, and the other band will have a range of substantially 10,000 to 30,000 cycles per second.

The channel having the 50 to 10,000 cycle band is impressed on the magnetic recording head 8, and the other frequency band is impressed on a magnetic recording head 9. These recording heads may be of the usual type, such as disclosed and claimed in my co-pending U. S. application Ser. No. 151,567, filed March 24, 1950. Both heads have front or recording gaps of the same width, which is of the order of one mil. While in practice the recording gap may actually only be .2 or .3 mil thick, yet the effective gap width is still of the order of one mil. Each head records the band impressed thereon along a separate area of the magnetic medium 10, as shown by the two tracks 11 and 12.

To reproduce the signal, two reproducing heads 14 and 15, having a construction similar to heads 8 and 9, are employed. The head 14 has a constant or uniform gap width of one mil, the same as heads 8 and 9, but the head 15 has a tapered or wedge-shaped form of gap, which is one mil wide at one end and two mils wide at the other end. Magnetic transducers having wedge-shaped gaps are now known, as evidenced by Howell U. S. Patent No. 2,469,266 of May 3, 1949. The reproducing circuit from the normal one mil gap head is passed through the attenuator 16 and then to an amplifier 17, while the output of the wedge-shaped gap 15 is impressed directly on the amplifier 17. The amplifier is then connected to any current-to-sound wave translator, not shown. Instead of attenuator 16, an additional amplifier could be provided in the channel from head 15.

To explain the operation of the system shown in Fig. 1, reference is made to the graph in Fig. 2. This figure shows the "gap effect" of separate reproduce heads having front gap widths of one and two mils and for a tape speed of eighteen inches per second. It is seen that, when the first null frequency is exceeded for a given gap length, the magnetic head responds again to the signal until a second null frequency is reached. (Note curves A and B.) As mentioned above and illustrated in the above mentioned Friend co-pending application, the cycle is repeated with nulls occurring at substantially integral multiples of the first null frequency.

The gap of a recording head may be, and frequently is, made several times longer than that of a reproduce head without curtailing the useful recorded frequency range. In other words, while a recording head with a one mil recording gap is able to record frequencies of 30,000 cycles per second, a reproducing head with a one mil gap is able to reproduce, effectively, only frequencies in the neighborhood of 15,000 cycles per second when the first null occurs. Thus, between the peaks of curves A and B, there is an infinite number of peaks corresponding to reproduce head gaps widths between one mil and two mils, the solid line representing a reproduce head with a one mil gap width, and the dotted line representing a reproduce head with a two mil gap width. Thus, if a reproduce head is built with a tapered or wedge-shaped gap, the maximum width of which is two mils and the minimum width of which is one mil, this head is able to reproduce the entire frequency band between the two peaks A and B.

The sensitivity of this head will be comparatively low, not only because the amplitude of the secondary peaks are low compared to the amplitude in the primary region, but also because the "length" of each gap corresponding to a definite gap 'width" is very small. However, as can be sen in Fig. 2, the peaks are not sharp so that, in spite of the infinitesimal length corresponding to any one definite width of gap, the head is able to reproduce the frequency region of the secondary peaks. It may be noted that, unless the tape or film speed is increased or a frequency region is transposed entirely to a peak frequency region, as disclosed and claimed in the above mentioned Friend application, the present system will extend the recorded frequency range. Thus, by utilizing two recording channels, two recording heads having gap widths in the neighborhood of one mil, two reproducing channels, and two reproducing heads, one having a constant gap width of one mil, and the other having a wedge-shaped gap varying from one mil to two mils in width, signals having wide frequnency spectrums are recordable and reproducible with fidelity. Although the division of the signal or cross-over point may vary with tape speed, the point of separation for a signal having a frequency range between 50 and 30,000 cycles per second may be divided at 10,000 cycles when the tape speed is eighteen inches per second. The use of an attenuator, as shown in Fig. 1, or an amplifier for the head 15 is because of the differential between the primary and secondary response regions, as shown in Fig. 2, and the small "length" of each gap of a definite "width" of wedge-shaped head 15.

I claim:

1. A system for recording and reproducing a band of frequencies to and from a moving magnetizable medium which avoids nodal points which would otherwise appear in the reproduced output which comprises separating means for dividing said band of frequencies into upper and lower frequency bands at a frequency in the region of the frequency at which the first of said nodal points normally occurs, a first and a second recording means adjacent to said magnetizable medium, means coupling said first and second recording means to said separating means in such manner that said first recording means receives said lower band of frequencies and said second recording means receives said upper band of frequencies, a first and a second pickup means adjacent to said magnetizable medium for respectively picking up signals recorded in said medium by said recording means, said first pickup means having a substantially constant width magnetic gap, said second pickup means having a substantially wedge-shaped magnetic gap, amplitude equalizing means coupled to one of said pickup means, and signal combining means coupled to said equalizing means and to the other of said pickup means whereby the said upper and said lower frequency bands are recombined for reproduction in their original amplitude relationship.

2. A system substantially as claimed in claim 1 wherein the narrowest width of said wedge-shaped gap is substantially equal to the width of the gap of said lower frequency pickup means, and the widest width of said wedge-shaped gap is substantially twice the width of the gap of said lower frequency pickup means.

3. A system substantially as claimed in claim 2 wherein the gap width of said lower frequency band reproducing means is substantially 1 mil, and the width of said wedge-shaped gap is substantially 1 mil at its narrowest point and substantially 2 mils at its widest point.

4. A system substantially as claimed in claim 1 wherein said equalizing means is an attenuator operatively inserted in the output circuit of said lower frequency band pickup means.

5. A system substantially as claimed in claim 1 wherein said equalizing means is an amplifier operatively inserted in the output circuit of said upper frequency band pickup means.

6. A system substantially as claimed in claim 2 wherein said equalizing means is an attenuator operatively inserted in the output circuit of said first pickup means.

7. A system substantially as claimed in claim 2 wherein said equalizing means is an amplifier operatively inserted in the output circuit of said second pickup means.

8. A system substantially as claimed in claim 3 wherein said equalizing means is an amplifier operatively inserted in the output circuit of said second pickup means and said point of frequency separation is approximately 10,000 cycles.

References Cited in the file of this patent

UNITED STATES PATENTS

| Number | Name | Date |
|---|---|---|
| 2,213,246 | Keller | Sept. 3, 1940 |
| 2,272,821 | Roys | Feb. 10, 1942 |
| 2,469,266 | Howell | May 3, 1949 |
| 2,532,917 | Howell | Dec. 5, 1950 |

FOREIGN PATENTS

| Number | Country | Date |
|---|---|---|
| 504,932 | Great Britain | Apr. 28, 1939 |
| 830,073 | France | May 7, 1938 |